United States Patent
Fukumoto (10) Patent No.: US 6,927,989 B2
(45) Date of Patent: Aug. 9, 2005

(54) DC-AC CONVERTER AND CONTROLLER IC FOR THE SAME

(75) Inventor: Kenichi Fukumoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/740,541

(22) Filed: Dec. 22, 2003

(65) Prior Publication Data

US 2004/0130921 A1 Jul. 8, 2004

(30) Foreign Application Priority Data

Dec. 25, 2002 (JP) .................................... P. 2002-373749

(51) Int. Cl.$^7$ .......................................... H02M 7/521
(52) U.S. Cl. ....................................... 363/95; 363/98
(58) Field of Search ............................. 363/95, 97, 98, 363/131, 132

(56) References Cited

U.S. PATENT DOCUMENTS

| | | | | |
|---|---|---|---|---|
| 5,640,313 A | * | 6/1997 | Takehara et al. | 363/97 |
| 5,739,676 A | * | 4/1998 | Judge et al. | 322/22 |
| 6,259,615 B1 | | 7/2001 | Lin | |
| 6,396,722 B2 | * | 5/2002 | Lin | 363/98 |
| 6,515,881 B2 | * | 2/2003 | Chou et al. | 363/95 |
| 6,804,129 B2 | * | 10/2004 | Lin | 363/98 |
| 6,809,938 B2 | * | 10/2004 | Lin et al. | 363/17 |

FOREIGN PATENT DOCUMENTS

| | | |
|---|---|---|
| JP | 10-50489 A | 2/1998 |
| JP | 10-112396 | 4/1998 |
| JP | 2002-043088 | 2/2002 |
| JP | 2002-221701 A | 8/2002 |
| JP | 2002-359097 | 12/2002 |

* cited by examiner

*Primary Examiner*—Adolf Berhane
(74) *Attorney, Agent, or Firm*—Morgan Lewis Bockius LLP (57) ABSTRACT

A constant current control is performed by PWM, and an analog burst control and a digital burst control are made selectable. The burst controls are selected in the following manner. A capacitor is selected as an element which is to be connected to a triangular signal oscillator circuit, to generate a triangular signal, thereby setting the analog burst control. A resistor is selected as the element to generate a constant voltage, thereby setting the digital burst control. A controller IC is used commonly in both the burst controls.

6 Claims, 7 Drawing Sheets

DC-AC CONVERTER AND CONTROLLER IC FOR THE SAME

BACKGROUND OF THE INVENTION

1. Field of the Invention

The present invention relates to a DC-AC converter (hereinafter, referred to as inverter) which generates an AC voltage for driving a load from a DC power source such as a power source adapter provided in an electric apparatus, or a battery, and a controller IC for such an inverter.

2. Description of the Related Art

A cold cathode fluorescent lamp (CCFL) has been used as a backlight source for a liquid crystal monitor of a notebook computer or a liquid crystal display device of an LCD television receiver. A CCFL has an efficiency and a long life which are approximately equivalent to those achieved by a usual hot cathode fluorescent lamp, however omitted is a filament that is used in a hot cathode fluorescent lamp.

In order to start and operate a CCFL, a high AC voltage is required. For example, the starting voltage is about 1,000 V (root-square-mean value, hereinafter this is applicable to an AC voltage), and the operating voltage is about 600 V. These high AC voltages are generated by a DC power source of a notebook computer or an LCD television receiver in which an inverter is used.

In general, a Royer circuit has been used for an inverter for a CCFL. The Royer circuit is configured by a saturable core transformer, control transistors, etc. which enables the circuit to self-oscillate by the nonlinear permeability of the saturable core transformer and the nonlinear current gain characteristics of the control transistors. For this reason, the Royer circuit itself does not require an external clock or a driver circuit.

However, a Royer circuit is basically a constant voltage inverter, which cannot maintain the constant output voltage when the input voltage or the load current is varied. Therefore, a regulator for supplying a power to a Royer circuit is required. Because of this requirement, downsizing of an inverter using a Royer circuit is difficult and its power conversion efficiency is relatively low.

As disclosed in JP Hei 10-50489, an inverter for a CCFL which is configured so as to enhance the power conversion efficiency is proposed. In the inverter, a first semiconductor switch is connected in series to a primary winding of a transformer, a series connection of a second semiconductor switch and a capacitor is connected in parallel to the primary winding of the transformer, and a coupling capacitor and a load are connected in series to a secondary winding of the transformer. The primary current of the transformer is fed back to a controlling circuit to be compared with a reference voltage, thereby forming a control signal. The first and second semiconductor switches are ON/OFF-controlled by the control signal, so that a predetermined AC power is supplied to the load.

A full bridge (H bridge) type inverter used for a CCFL where four semiconductor switches are used is proposed in U.S. Pat. No. 6,259,615. In the inverter, an output terminal of an H bridge is connected in series via a capacitor for oscillation to a primary winding of a transformer, and a load is connected to a secondary winding of the transformer. Among four semiconductor switches constituting the H bridge, a first set of two semiconductor switches form a current path in a first direction in the primary winding of the transformer, and a second set of two semiconductor switches form a current path in a second direction in the primary winding of the transformer. A current flowing through the secondary winding of the transformer is fed back to a controlling circuit to be compared with a reference voltage, thereby generating a control signal in which pulses have a fixed same width and relative positions of the pulses are controlled. The control signal is supplied to the semiconductor switches of the H bridge to adjust the power supply to the load. The voltage of the secondary winding of the transformer is detected in order to perform over-voltage protection.

Also a configuration is known in which a current flowing through a CCFL is detected, the duty of pulse width modulation (PWM) of lighting/non-lighting in an intermittent operation of an inverter power source apparatus is controlled to adjust the time ratio of lighting/non-lighting so that the currents has a predetermined value as disclosed in JP 2002-221701.

[Problems that the Invention is to Solve]

In the inverters such as disclosed in said patent publications, the ON times of the semiconductor switches are controlled so that the current of a predetermined value flows through the load, thereby controlling the power supply to the load. In order to reduce the power supply to the load, the width of the control pulse for turning ON a semiconductor switch is narrowed. However, the technique of stably supplying a small power to a load while narrowing the width of the control pulse has limitations. Therefore, the lighting control range of a CCFL serving as a load is hardly widened in the direction of the lower limit.

In the inverter of Patent literature 3, the time ratio of lighting (ON)/non-lighting (OFF) in an intermittent operation is controlled. However, it is difficult to finely perform a light control due to only the control of the intermittent operation.

SUMMARY OF THE INVENTION

It is an object of the invention to provide an inverter or a controller IC used for it in which switches of a semiconductor switching circuit connected to a primary winding of a transformer having a secondary winding connected to a load are pulse-width-modulated. (PWM) to perform a constant current control, and controls due to intermittent operations respectively based on an analog signal and a digital signal are made selectable, whereby the applicable range can be expanded, or the range of the power supply to the load can be expanded with its fine control being secured.

It is another object of the invention to provide a controller IC in which a constant current control is performed by pulse width modulation (PWM), and both a control of an intermittent operation based on an analog signal and that of an intermittent operation based on a digital signal can be performed.

(1) The inverter comprises:
  a transformer TR having a primary winding and at least one secondary winding; a semiconductor switching circuit 101 to 104 which allows a current from a DC power source BAT to flow in first and second directions through the primary winding;
  a current detecting circuit which detects a current flowing through a load FL connected to the secondary winding;
  a triangular signal generating section which generates a triangular signal CT;
  a PWM control signal generating section which compares an error signal FB due to a current detection signal IS output from the current detecting circuit, with the triangular signal CT to generate a PWM control signal;

an intermittent operation triangular signal generating section which includes an intermittent operation triangular signal oscillator circuit 202 and an intermittent operation capacitor 131, and which generates an intermittent operation triangular signal BCT;

a comparing section 221 which compares the intermittent operation triangular signal BCT with a continuous duty signal Va-du to generate an intermittent operation signal BRT; and an intermittent operation controlling section which, when an intermittent operation is turned OFF, sets the error signal FB to substantially zero on the basis of the intermittent operation signal BRT, the semiconductor switching circuit being switched in accordance with the PWM control signal.

(2) The inverter comprises:

a transformer TR having a primary winding and at least one secondary winding; a semiconductor switching circuit 101 to 104 which allows a current from a DC power source BAT to flow in first and second directions through the primary winding;

a current detecting circuit which detects a current flowing through a load FL connected to the secondary winding;

a triangular signal generating section which generates a triangular signal CT;

a PWM control signal generating section which compares an error signal FB due to a current detection signal IS output from the current detecting circuit, with the triangular signal CT to generate a PWM control signal;

an intermittent operation constant voltage generating section which includes an intermittent operation triangular signal oscillator circuit 202 and a resistor 131A, and which generates an intermittent operation constant voltage BCV;

a comparing section 221 which compares the intermittent operation constant voltage BCV with a pulse signal Vd-du to generate an intermittent operation signal BRT; and an intermittent operation controlling section which, when an intermittent operation is turned OFF, sets the error signal FB to substantially zero on the basis of the intermittent operation signal BRT, the semiconductor switching circuit being switched in accordance with the PWM control signal.

(3) The inverter is characterized in that, in the inverter of (1) or (2), the PWM control signal generating section comprises: an error amplifier 211 which compares the current detection signal IS with a reference voltage to generate the error signal FB; a PWM comparator 214 into which the error signal FB and the triangular signal CT are input, and which generates the PWM control signal; and a feedback circuit including a feedback capacitor 136 for feeding back the error signal FB to the current detection signal IS, and when the intermittent operation is turned OFF, the intermittent operation controlling section charges the feedback capacitor 136 in a direction along which the error signal FB becomes zero, and, when the intermittent operation is turned ON, discharges the feedback capacitor 136 in a direction along which the error signal FB is increased.

(4) The controller IC is a controller IC 200 for controlling a semiconductor switching circuit 101 to 104 which drives a load FL, and comprises:

a triangular signal oscillator circuit 201 which generates a triangular signal CT;

a PWM control signal generating circuit which compares an error signal FB due to a current detection signal IS indicative of detection of a current flowing through the load FL, with the triangular signal CT to generate a PWM control signal;

an intermittent operation triangular signal oscillator circuit 202 which, when coupled with an external intermittent operation capacitor 131, generates an intermittent operation triangular signal BCT, and which, when coupled with an external resistor 131A, generates an intermittent operation constant voltage BCV;

a comparing section 221 which compares the intermittent operation triangular signal BCT or the intermittent operation constant voltage BCV which is generated by the intermittent operation triangular signal oscillator circuit 202, with a continuous duty signal Va-du or a pulsative duty signal Vd-du that is input from an outside, to generate an intermittent operation signal BRT; and an intermittent operation controlling section which, when an intermittent operation is turned OFF, sets the error signal FB to substantially zero on the basis of the intermittent operation signal BRT, the controller IC generating a driving signal for switching the semiconductor switching circuit in accordance with the PWM control signal.

(5) The controller IC is characterized in that, in the controller IC of (4), the PWM control signal generating circuit comprises: an error amplifier 211 which compares the current detection signal IS with a reference voltage to generate the error signal FB; a PWM comparator 214 into which the error signal FB and the triangular signal CT are input, and which generates the PWM control signal; and a feedback circuit to which a feedback capacitor 136 for feeding back the error signal FB to the current detection signal IS is connected, and when the intermittent operation is turned OFF, the intermittent operation controlling section-charges the feedback capacitor 136 in a direction along which the error signal FB becomes zero, and, when the intermittent operation is turned ON, discharges the capacitor 136 in a direction along which the error signal FB is increased.

(6) The controller IC is characterized in that, in the controller IC of (4) or (5), the controller IC comprises an intermittent operation terminal 2P to which the intermittent operation capacitor 131 or the resistor 131A is to be connected, and an input terminal 1P into which the continuous duty signal Va-du or the pulse signal Vd-du is to be input.

DESCRIPTION OF THE PREFERRED EMBODIMENTS

Hereinafter, an embodiment of the inverter of the invention which generates an AC voltage for driving a load from a DC power source, and the controller IC for the inverter will be described with reference to the accompanying drawings.

Figure 1:
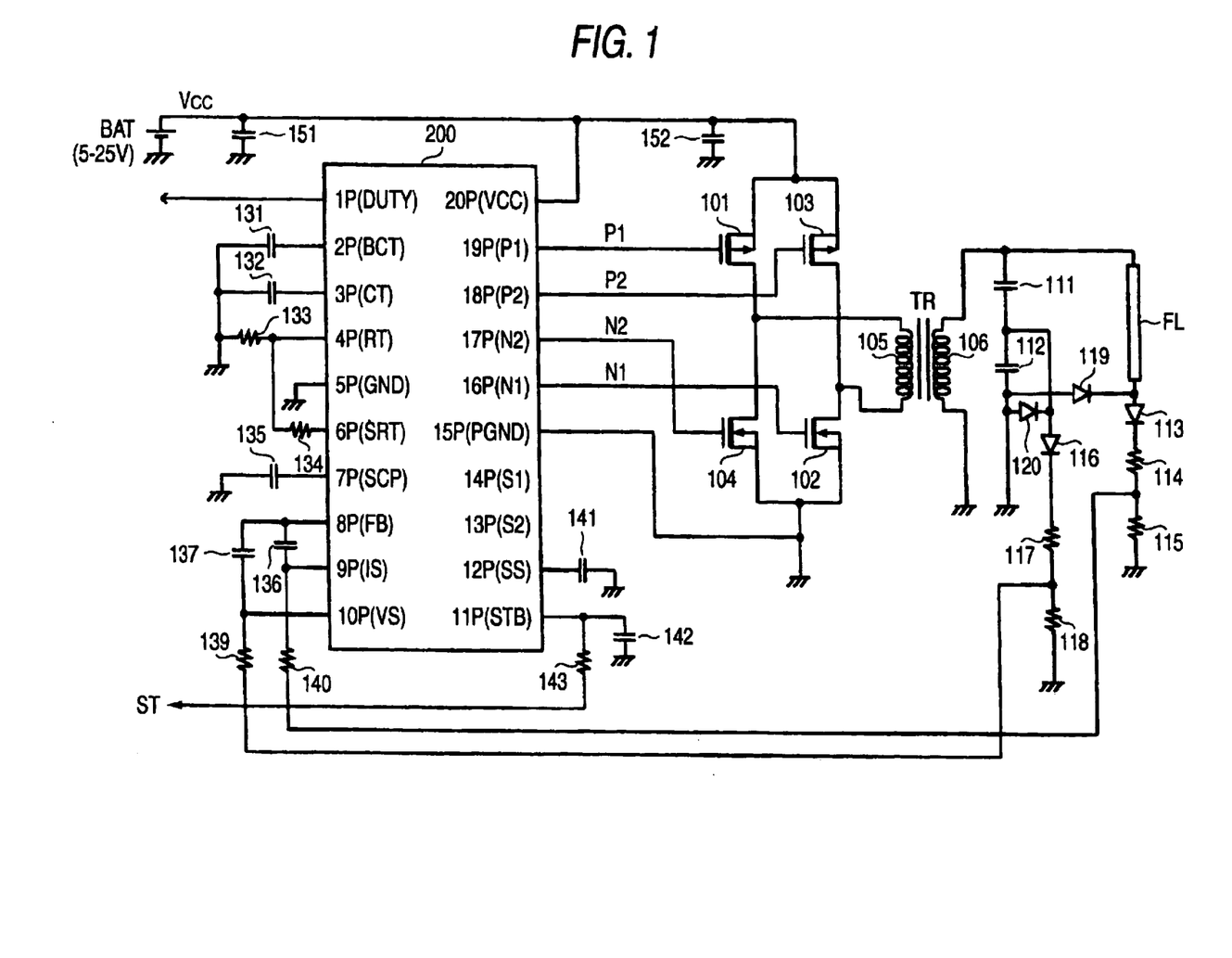
FIG. 1 is a diagram showing the whole configuration of an inverter of an embodiment of the invention.
Figure 2:
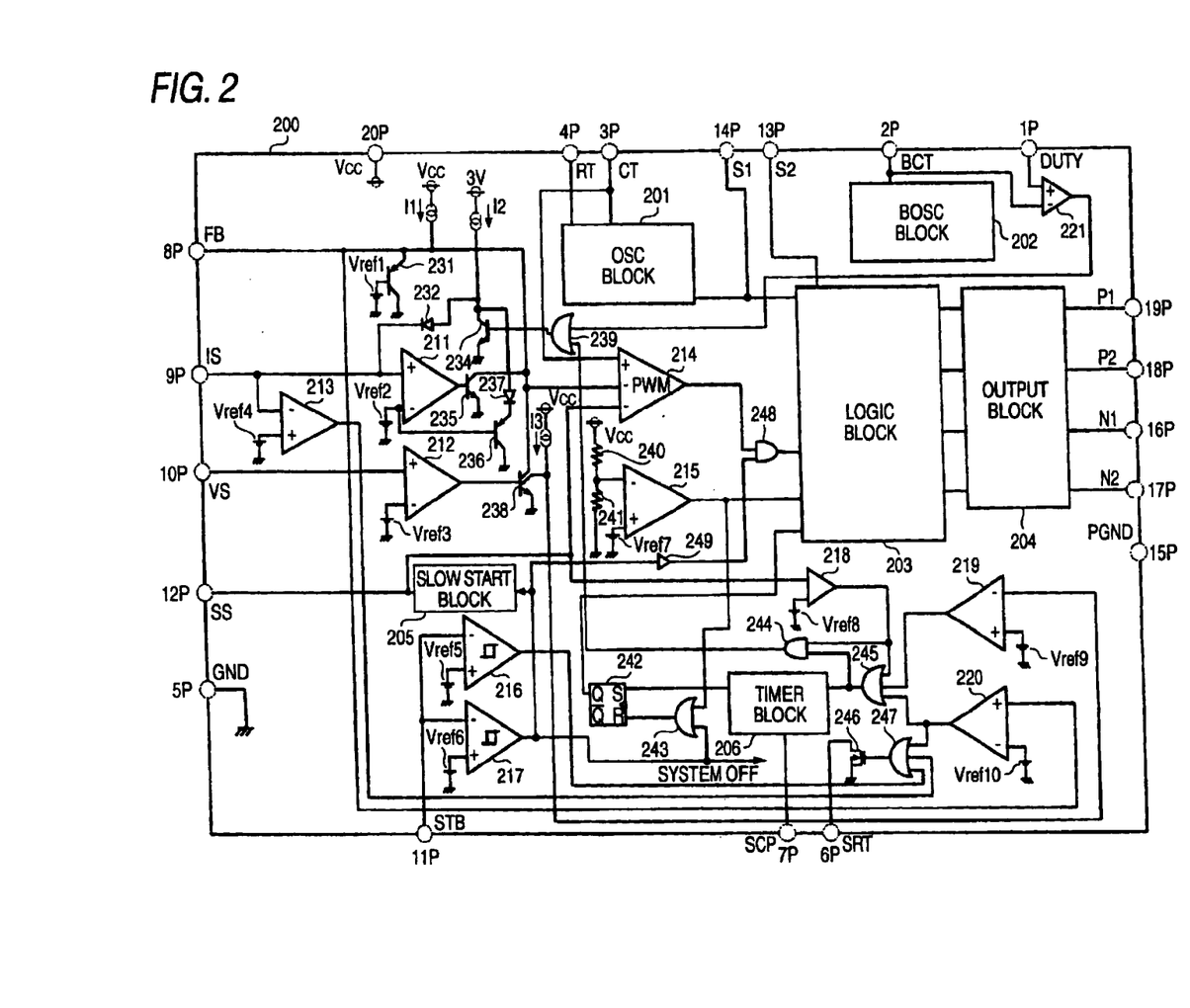
FIG. 2 is a diagram showing the internal configuration of an controller IC of FIG. 1.

FIG. 1 is a diagram showing the whole configuration of an inverter of an embodiment of the invention which performs a PWM control with using an insulating transformer and a full bridge (H bridge) switch circuit. FIG. 2 is a diagram showing the internal configuration of an controller IC for controlling the inverter.

Referring to FIG. 1, a P type MOSFET (hereinafter, PMOS) 101 which is a first switch, and an N type MOSFET (hereinafter, NMOS) 102 which is a second switch form a current path in a first direction to a primary winding 105 of a transformer TR. A PMOS 103 which is a third switch, and an NMOS 104 which is a fourth switch form a current path in a second direction to the primary winding 105 of the transformer TR. The PMOSs 101, 103 and the NMOSs 102, 104 have respective body diodes (i.e., back gate diodes). Because of the respective body diodes, a current which is in the direction opposite to the original current path can flow. Alternatively, diodes having the same functional manner as that of the body diodes might be also disposed.

A power source voltage VCC of a DC power source BAT is supplied to the primary winding 105 of the transformer TR through the PMOSs 101, 103 and the NMOSs 102, 104, and a high voltage corresponding to the turn ratio is induced in a secondary winding 106 of the transformer. Therefore, the induced high voltage is supplied to a cold cathode fluorescent lamp FL, so that the cold cathode fluorescent lamp FL is lit.

Capacitors 111, 112 function together with resistors 117, 118 to detect a voltage to be applied to the cold cathode fluorescent lamp FL and feed back the voltage to a controller IC 200. Resistors 114, 115 are used for detecting a current flowing through the cold cathode fluorescent lamp FL, and feeding back the current to the controller IC 200. The capacitance of the capacitor 111 cooperates with the inductance of the transformer TR to cause resonance. Also a parasitic capacitance of the transformer TR contributes to the resonance. The reference numerals 113, 116, 119, 120 denote diodes, and 151, 152 denote capacitors for stabilizing the power source voltage.

The controller IC 200 has plural input/output pins. A first pin 1P is a terminal which is used for switching over a PWM mode and an intermittent operation mode (hereinafter, referred to as a burst mode), and to which a duty signal DUTY that is switching said modes and determining the duty ratio in the burst mode is input from the outside. Further, a second pin 2P is an oscillation frequency setting capacitance connection terminal for a burst mode oscillator (BOSC) to which a setting capacitor 131 is connected so that a burst triangular signal BCT is generated.

A third pin 3P is an oscillation frequency setting capacitance connection terminal for a PWM mode oscillator (OSC) to which a setting capacitor 132 is connected so that a PWM triangular signal CT is generated. A fourth pin 4P is a charging current setting resistor connection terminal for the third pin 3P to which a setting resistor 133 is connected, and through which a current corresponding to the potential RT of the pin and the resistance flows. A fifth pin 5P is a ground terminal which is at the ground potential GND.

A sixth pin 6P is a charging current setting resistor connection terminal for the third pin 3P to which a setting resistor 134 is connected. The resistor 134 is connected in parallel to or disconnected from the setting resistor 133 by a control of an internal circuit, so that the potential SRT of the pin is set to the ground potential GND or the potential RT of the fourth pin 4P. A seventh pin 7P is a timer latch setting capacitance connection terminal to which a capacitor 135 for determining the operation time limit of an internal protection operation is connected so that a potential SCP corresponding to charges of the capacitor 135 is generated.

A current detection signal (hereinafter, referred to as detection current) IS corresponding to the current flowing through the cold cathode fluorescent lamp FL is input to a ninth pin 9P through a resistor 140. The detection current is then input to a first error amplifier. An eighth pin 8P is a first-error amplifier output terminal. A capacitor 136 is connected between the eighth pin 8P and the ninth pin 9P. The potential of the eighth pin 8P is a feedback voltage FB to be used as a control voltage for a PWM control. Hereinafter, voltages are those with respect the ground potential unless otherwise specified.

A voltage detection signal (hereinafter, referred to as detection voltage) VS corresponding to the voltage applied to the cold cathode fluorescent lamp FL is input to a tenth pin 10P through a resistor 139. The detection voltage is input to a second error amplifier. A capacitor 137 is connected between the tenth pin 10P and the eighth pin 8P.

An eleventh pin 11P is a start and starting time set terminal to which a signal STB that is obtained by delaying a start signal ST by a resistor 143 and a capacitor 142 is applied. A twelfth pin 12P is a slow-start setting capacitance connection terminal. A capacitor 141 is connected between the twelfth pin and the ground. A slow-start voltage SS which is gradually raised in the starting period appears at the pin.

A thirteenth pin 13P is a synchronization terminal which, in the case where the controller IC is to cooperate with another controller IC, is connected to the other controller IC. A fourteenth pin 14P is an internal-clock input/output terminal which, in the case where the controller IC is to cooperate with another controller IC, is connected to the other controller IC.

A fifteenth pin 15P is a ground terminal for an external FET driving circuit. A sixteenth pin 16P is a terminal for outputting a gate driving signal N1 for the NMOS 102. A seventeenth pin 17P is a terminal for outputting a gate driving signal N2 for the NMOS 104. An eighteenth pin 18P is a terminal for outputting a gate driving signal P2 for the PMOS 103. A nineteenth pin 19P is a terminal for outputting a gate driving signal P1 for the PMOS 101. A twentieth pin 20P is a power source terminal to which the power source voltage VCC is input.

Referring to FIG. 2 showing the internal configuration of the controller IC 200, an OSC block 201 generates a PWM triangular signal CT which is determined by the capacitor 132 connected to the third pin 3P, and the resistors 133, 134 connected to the fourth pin 4P, and which is supplied to a PWM comparator 214, and generates also an internal clock which is supplied to a logic block 203.

A BOSC block 202 is a burst triangular signal oscillator circuit which generates the burst triangular signal BCT that is determined by the capacitor 131 connected to the second pin 2P. The BCT frequency is set to be much lower than the CT frequency (the BCT frequency<the CT frequency). A comparator 221 compares the analog (DC voltage) duty signal DUTY supplied to the first pin 1P with the triangular signal BCT. The comparison output signal drives an NPN transistor 234 (hereinafter, referred to NPN) through an OR circuit 239. In the case where a digital (PWM format) duty signal DUTY is supplied to the first pin 1P, a resistor is connected to the second pin 2P to cause the BOSC block 202 to generate a burst constant voltage.

The logic block 203 receives a PWM control signal and other signals, and produces a switch driving signal in accordance with a predetermined logic, so that the gate driving signals P1, P2, N1, N2 are applied through an output block 204 to the gates of the PMOSs 101, 103 and the NMOSs 102, 104, respectively.

A slow start block 205 is activated by the start signal ST which is an output signal of the comparator 217 being generated when the input to a comparator 217, namely the voltage STB, which is slowly raised by the capacitor 142 and the resistor 143, exceeds a reference voltage Vref6. Further, said output of the comparator 217 enables the logic block 203 to be driven through an inverting circuit 249. Still further, the output of the comparator 217 resets a flip-flop (FF) circuit 242 through an OR circuit 243. When the start block 205 is activated, the slow-start voltage SS is gradually raised, and supplied as a comparison input to the PWM comparator 214. In the starting period, therefore, the PWM control is performed in accordance with the slow-start voltage SS.

In the starting period, at a timing when the input exceeds a reference voltage Vref5, a comparator 216 causes an NMOS 246 to be turned OFF through an OR circuit 247. As a result, the resistor 134 is disconnected, and the frequency of the PWM triangular signal CT is changed. Also an output of a comparator 213 is input to the OR circuit 247.

The detection current IS which is proportional to the current of the cold cathode fluorescent lamp FL is input to a first error amplifier 211 to be compared with a reference voltage Vref2 (for example, 1.25 V). An output corresponding to the error controls an NPN 235 connected to a constant current source I1. The collector of the NPN 235 is connected to the eighth pin 8P where the potential of said connection point is used as the feedback voltage FB to be input as a comparison input to the PWM-comparator 214.

In the PWM comparator 214, the triangular signal CT is compared with the lower one of the feedback voltage FB and the slow-start voltage SS, to generate the PWM control signal. The PWM control signal is supplied to the logic block 203 through an AND circuit 248. In a steady state after the starting period is ended, the triangular signal CT is compared with the feedback voltage FB, and an automatic control is performed so that a preset current flows to the cold cathode fluorescent lamp FL.

Since the capacitor 136 is connected between the eighth pin 8P and the ninth pin 9P, the feedback voltage FB is smoothly raised or lowered. Therefore, the PWM control is smoothly performed without causing a shock.

The detection voltage VS which is proportional to the voltage of the cold cathode fluorescent lamp FL is input to the second error amplifier 212 to be compared with a reference voltage Vref3 (for example, 1.25 V). An output corresponding to the error controls a double-collector NPN 238 in which one of the double collectors is connected to the constant current source I1. Since the collector of the NPN 238 is connected also to the eighth pin 8P, the feedback voltage FB is controlled also by the detection voltage VS. It is noted that when the feedback voltage FB exceeds a reference voltage Vref1 (for example, 3 V), a PNP transistor (hereinafter, referred to simply as PNP) 231 is turned ON to prevent the feedback voltage FB from being excessively raised.

A comparator 215 compares a voltage which is obtained by dividing the power source voltage VCC by resistors 240, 241, with a reference voltage Vref7 (for example, 2.2 V). At a timing when the power source voltage VCC reaches a predetermined level, the output of the comparator is inverted to reset the FF circuit 242 through the OR circuit 243.

A comparator 218 compares the slow-start voltage SS with a reference voltage Vref8 (for example, 2.2V). When the voltage SS becomes higher, the NPN 234 is turned ON through an AND circuit 244 and the OR circuit 239. When the NPN 234 is turned ON, a diode 232 is reversely biased by the current source I2, with the result that the normal operation of the first error amplifier 211 is enabled.

When the NPN 238 in which the other one of the double collectors is connected to a constant current source I3 is turned ON by the second error amplifier 212, the voltage of the collector is lower than a reference voltage Vref9 (for example, 3.0 V), and the comparison output of a comparator 219 is inverted. A comparator 220 compares the feedback voltage FB with a reference voltage Vref10 (for example, 3.0 V) so that in case of the feedback voltage FB becoming higher, the comparison output is inverted. The outputs of the comparators 219, 220 and an inverted signal of the output of the comparator 218 are applied to a timer block 206 through an OR circuit 245, and then output after a predetermined time is measured. In response to the output of the timer block 206, the FF circuit 242 is set. The operation of the logic block 203 is stopped by the Q output of the FF circuit 242.

Figure 3:
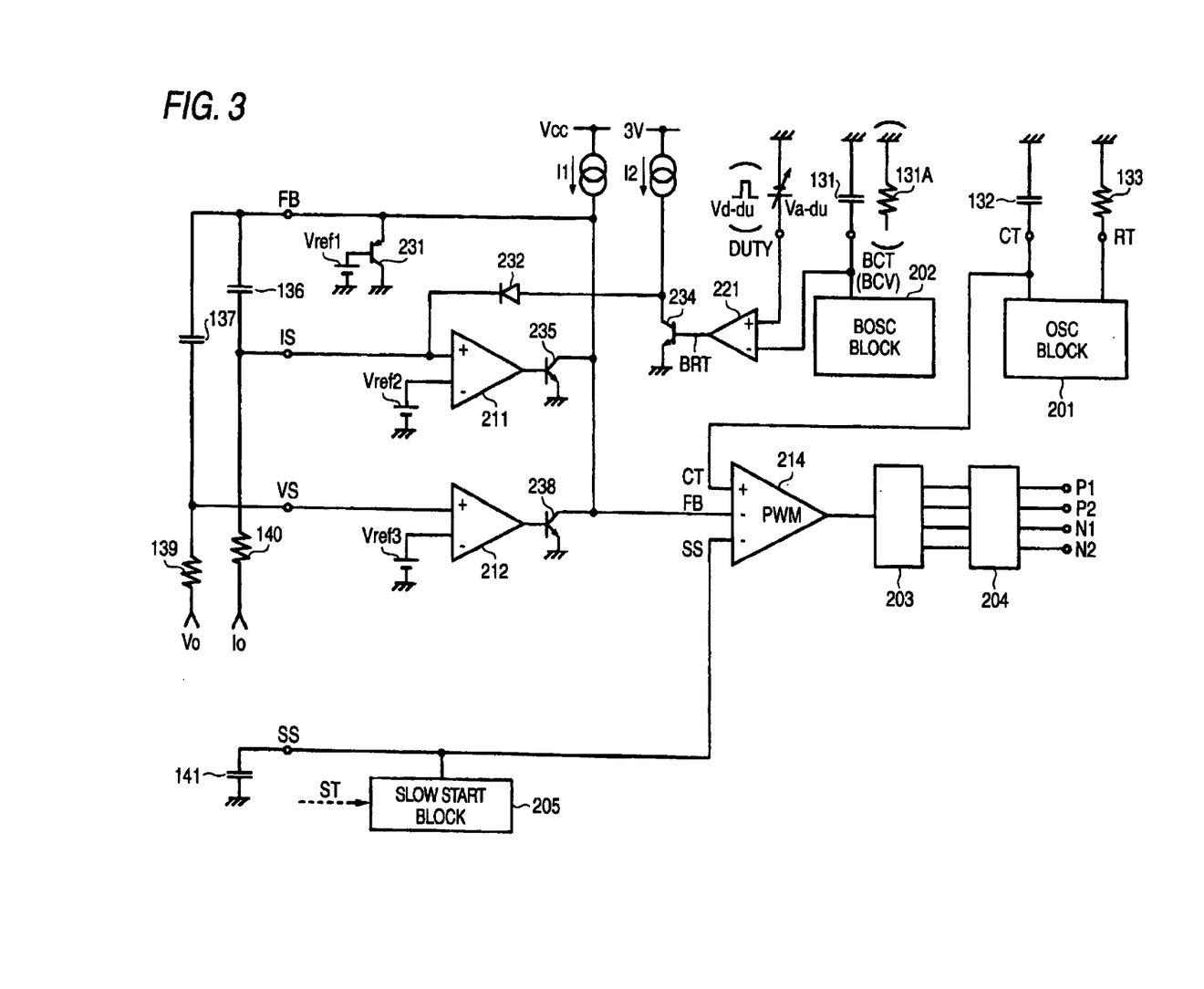
FIG. 3 is an illustrative circuit diagram relating to the burst mode.
Figure 4:
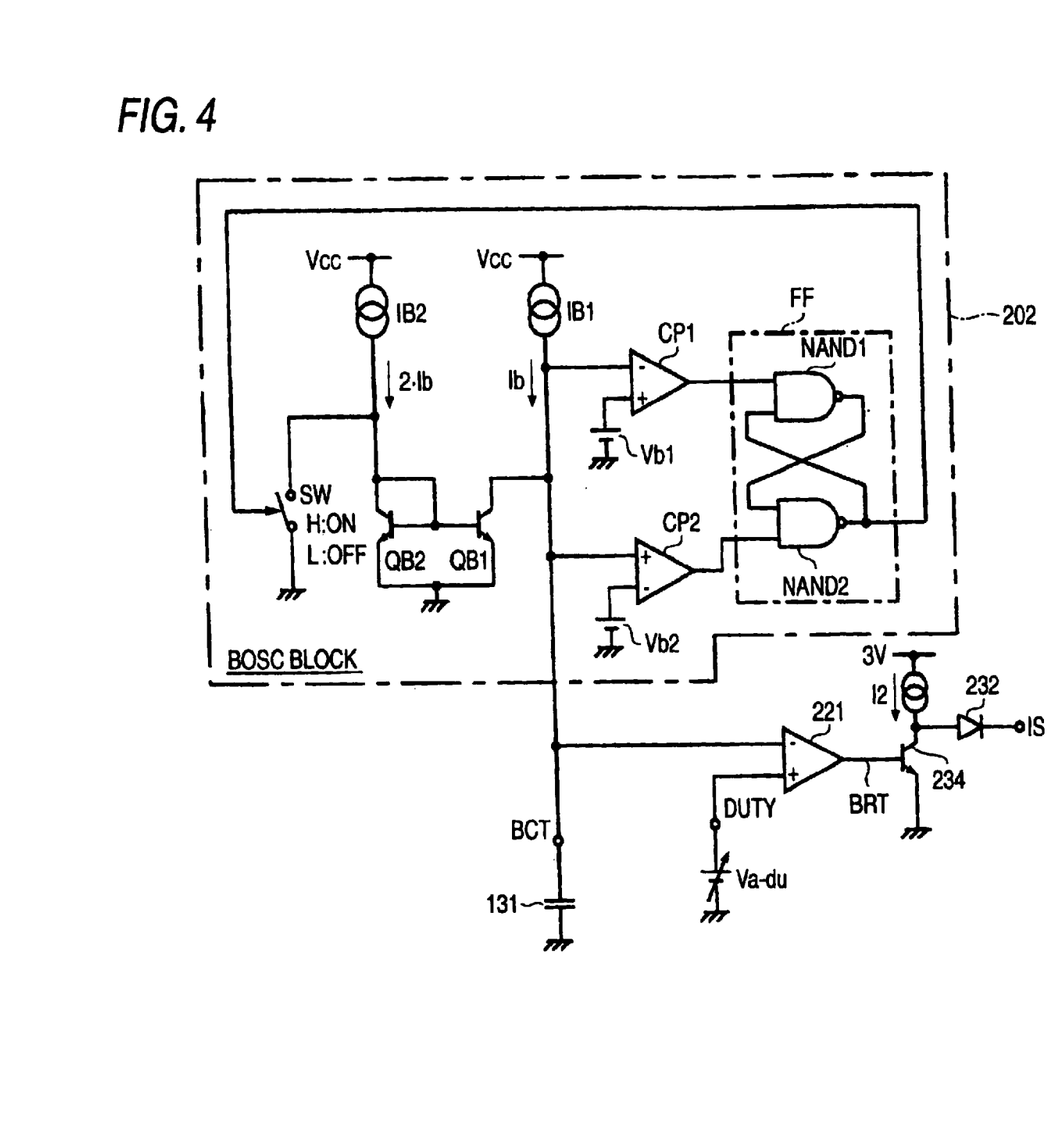
FIG. 4 is a view showing the configuration in the case of an analog light control.
Figure 5:
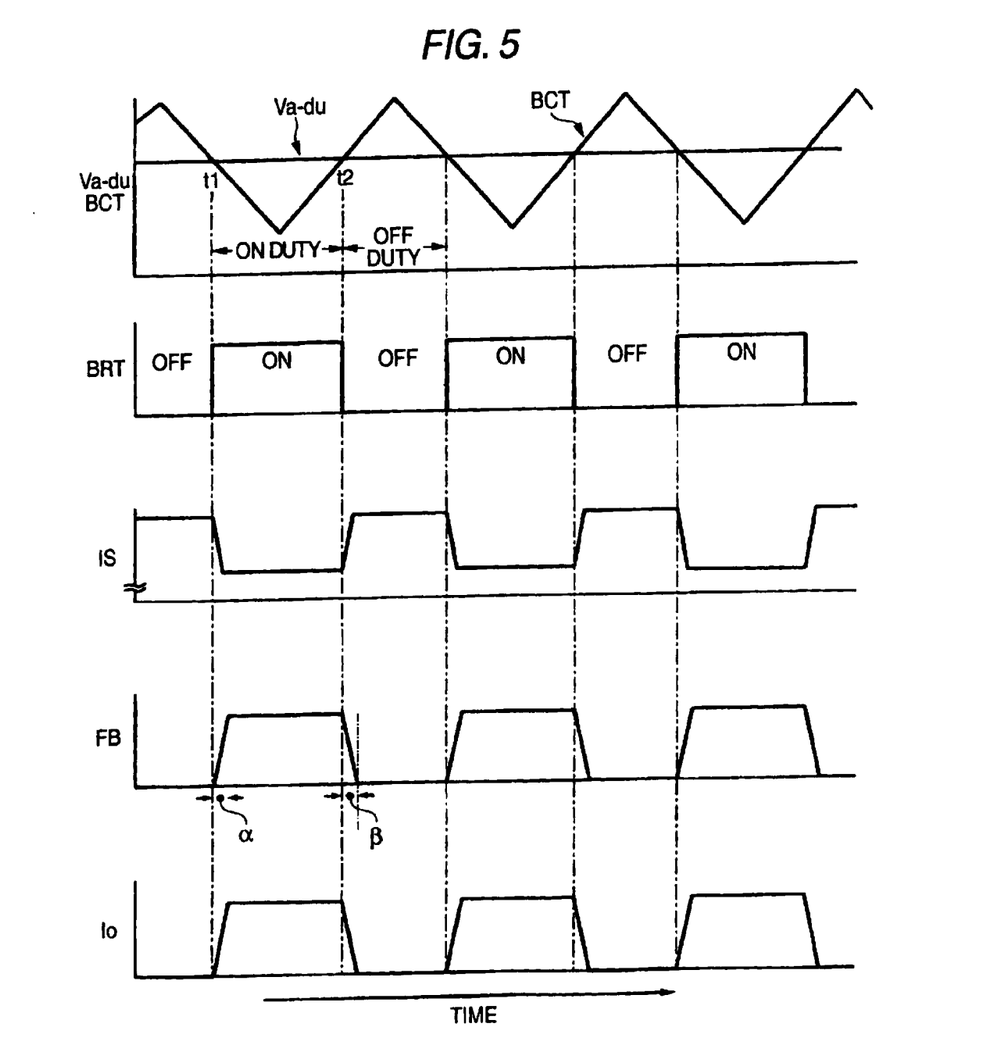
FIG. 5 is a timing chart illustrating the operation in the analog light control.
Figure 6:
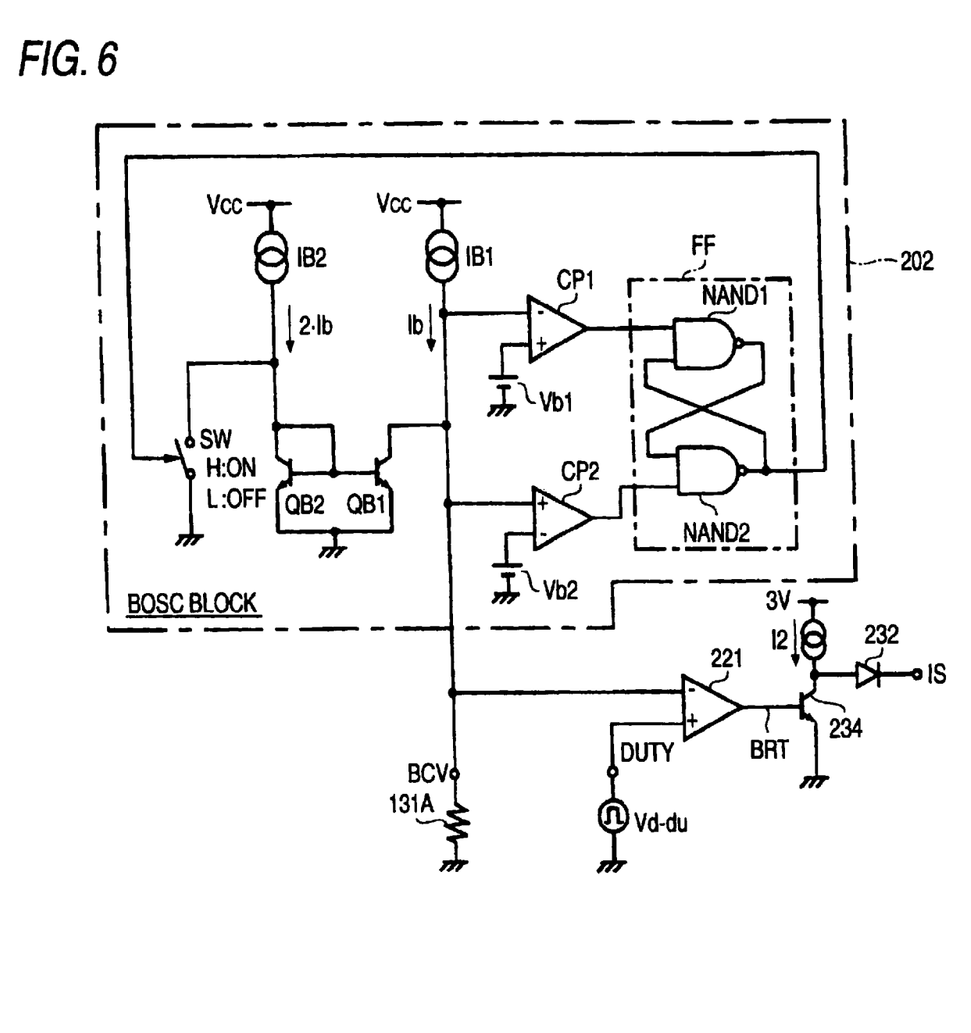
FIG. 6 is a view showing the configuration in the case of a digital light control.
Figure 7:
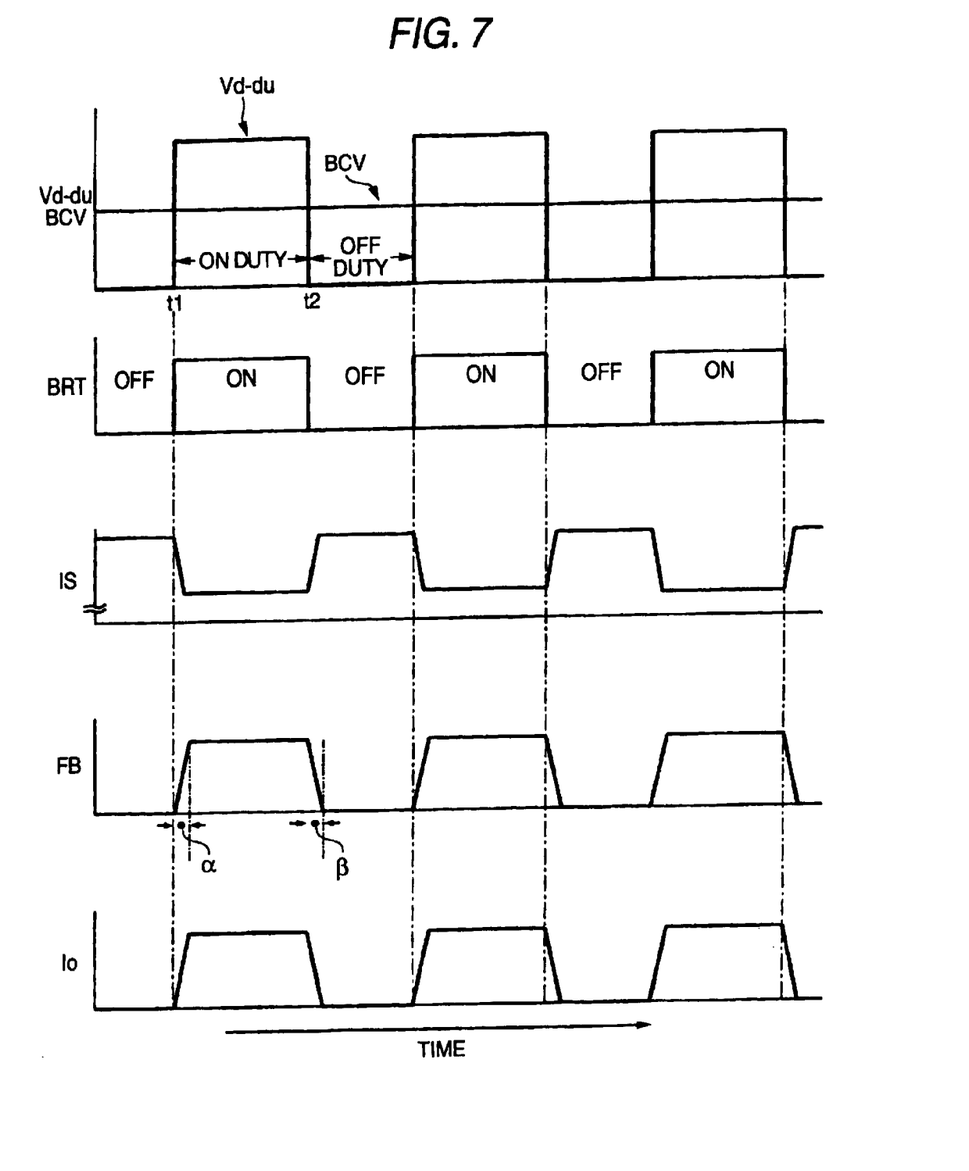
FIG. 7 is a timing chart illustrating the operation in the digital light control.

Next, the operation of the thus configured inverter, particularly the configuration and the operation in burst modes in the cases of an analog light control in which the duty signal DUTY is supplied in the form of a continuous duty signal Va-du, and of a digital light control in which the duty signal DUTY is supplied in the form of a pulsative duty signal Vd-du will be described with reference to also FIGS. 3 to 7. FIG. 3 is an illustrative circuit diagram showing portions of FIGS. 1 and 2 which relate to the slow start in the starting period and the burst mode. FIG. 4 is a view showing the configuration in the case of the analog light control and also the internal configuration of the BOSC block 202. FIG. 5 is a timing chart illustrating the operation of the block. FIG. 6 is a view showing the configuration in the case of the digital light control and also the internal configuration of the BOSC block 202. FIG. 7 is a timing chart illustrating the operation of the block.

Referring to FIG. 3, in the case of the analog light control, the continuous analog duty signal Va-du is supplied as the duty signal DUTY from the outside. In the case of the analog light control, the capacitor 131 is connected to the BOSC block 202 in accordance with the analog duty signal Va-du. As a result of the connection of the capacitor 131, the burst triangular signal BCT is output from the BOSC block 202. The comparator 221 compares the analog duty signal Va-du with the burst triangular signal BCT, and an intermittent operation signal (burst signal) BRT is output. When the burst signal BRT is at a high (H) level, the burst mode is ON, and, when the burst signal BRT is at a low (L) level, the burst mode is OFF.

By contrast, in the case of the digital light control, a pulsative (PWM format) digital duty signal Vd-du based on, for example, digital data produced by a personal computer is supplied as the duty signal DUTY from the outside. In the case of the digital light control, the resistor 131A is connected to the BOSC block 202 in accordance with the digital duty signal Vd-du. As a result of the connection of the resistor 131A, a burst constant voltage signal BCV is output from the BOSC block 202. The comparator 221 compares the digital duty signal Vd-du with the burst constant voltage signal BCV, and the burst signal BRT is output. When the burst signal BRT is at the H or L level, the burst mode is similarly ON or OFF.

The internal configuration and the operation of the BOSC block 202 will be described with reference to FIG. 4 showing the configuration in the case of the analog light control.

A constant current source IB1 of a current value Ib is connected in series to an NPN QB1, and a constant current source IB2 of a current value 2∘Ib is connected in series to an NPN QB2. The bases of the two transistors are connected to each other, and the collector and the base of the NPN QB2 are connected to each other. As a result, the transistors QB1, QB2 constitute a current mirror configuration. A switch SW is connected in parallel to the NPN QB2. When an operation signal is at the H level, the switch SW is turned ON, and, when the signal is at the L level, the switch is turned OFF. For example, an NPN or an NMOS is used as the switch.

The voltage of the connection point of the constant current source IB1 and the NPN QB1 is supplied to a (−) input terminal of a comparator CP1 and a (+) input terminal of a comparator CP2. A reference voltage Vb1 of the comparator CP1 is set to be higher than a reference voltage Vb2 of the comparator CP2 (Vb1>Vb2). Outputs of the comparators CP1 and CP2 are input to a set/rest type flip-flop circuit FF. An output of the flip-flop circuit FF is supplied as the operation signal for the switch SW. In this example, the flip-flop circuit FF is configured by using two NAND circuits NAND1, NAND2.

In the case of the analog light control, the capacitor 131 is connected to the constant current source IB1 of the BOSC block 202. When the output of the flip-flop circuit FF is at the H level and the switch SW is ON, the constant current Ib flows into the capacitor 131, and the voltage is raised. When the charging voltage of the capacitor 131 reaches the reference voltage Vb1, the output of the comparator CP1 is inverted (H→L), and the output of the flip-flop circuit FF is changed from the H level to the L level.

When the output of the flip-flop circuit FF is at the L level and the switch SW is OFF, the constant current Ib of the constant current source IB1 and the constant current Ib from the capacitor 131 flow into the NPN QB1, and the voltage of the capacitor 131 is lowered. When the charging voltage of the capacitor 131 reaches the reference voltage Vb2, the output of the comparator CP2 is inverted (H→L), and the output of the flip-flop circuit FF is changed from the L level to the H level.

In this way, the voltage of the capacitor 131 is raised or lowered between the reference voltages Vb1 and Vb2, and the burst triangular signal BCT having a period which depends on the constant current Ib and the capacitance of the capacitor 131 is generated.

Next, the operation of the BOSC block 202 will be described with reference to FIG. 6 showing the configuration in the case of the digital light control.

In the case of the digital light control, the resistor 131A is connected to the constant current source IB1 of the BOSC block 202. The burst constant voltage signal BCV is determined by a product of the resistance of the resistor 131A and the constant current Ib, and the level of the signal is set so as to be between the reference voltages Vb1 and Vb2 (Vb1>BCV>Vb2). Therefore, the resistance of the resistor 131A is determined so as to satisfy such conditions with respect to the constant current Ib.

In this case, the output of the flip-flop circuit FF is at the H level and the switch SW is ON, so that the constant current Ib flows to the resistor 131A and the burst constant voltage BCV is generated. Of course, the constant voltage BCV is not changed. Therefore, the output of the flip-flop circuit FF is fixed to the H level. Even when the output of the flip-flop circuit FF is initially at the L level, the output is immediately inverted to the H level, and the state is maintained.

First, the starting period of the operation in the case of the analog light control will be described. When the start signal ST becomes the H level in the state where the power source voltage VCC is supplied to the controller IC 200, the signal STB is raised in accordance with the time constant which depends on the resistor 143 and the capacitor 142. When signal level exceeds the reference voltage Vref6, the output of the comparator 217 is changed from the H level to the L level. As a result, the system-off state is canceled and the power source voltage is supplied to the other portions of the controller IC 200.

When the output of the L level is supplied from the comparator 217 to the start block 205 which is a slow-start circuit, a constant current source in the start block 205 is driven, and the constant current begins to flow into the capacitor 141. The capacitor 141 is charged by the constant current, and the slow-start voltage SS-begins to be raised. Namely, slow start in the starting period is commenced.

The feedback voltage FB that is to be input to one of the two (−) input terminals of the PWM comparator 214 is set to have a higher level (upper limit level) by a common circuit to which the power source voltage VCC is supplied, and which is configured by the constant current source I1 and the NPNs 235 and 238. The level of the feedback voltage FB is limited to a constant value by the PNP 231 and the reference voltage Vref1.

The PWM comparator 214 compares the slow-start voltage SS which is gradually raised with the triangular signal CT, and outputs a PWM control signal PWM1 corresponding to the level of the slow-start voltage SS. When the triangular signal CT is lower than the slow-start voltage SS and the feedback voltage FB, the PWM comparator 214 outputs a PWM control signal PWM of the H level. In the logic block 203 and the output block 204, the gate driving signals P1 to N2 are formed on the basis of the PWM control signal PWM. The signals are supplied to the MOSFETs 101 to 104 so that an inverter operation is performed.

Since the cold cathode fluorescent lamp FL which is a load of the inverter does not turn on until the applied voltage reaches a predetermined level, in the initial stage of the slow start, the output voltage Vo is raised as the slow-start voltage SS is raised. As a result, an excessive output voltage Vo (for example, 2,000 to 2,500 V) is not applied to the cold cathode fluorescent lamp FL, such as shown in the conventional art, in accordance with the feedback voltage FB which is at the upper limit level. Further, an inrush current due to application of an excessive output voltage Vo does not occur so that damages or stress imposed on the cold cathode fluorescent lamp FL and principal circuit components (such as the MOSFETs 101 to 104, the transformer TR, and the battery BAT) of the inverter can be remarkably reduced.

The output voltage Vo and an output current Io are detected, and the first and second error amplifiers 211 and 212 compare the detection voltage VS and the detection current IS with the reference voltages Vref2 and Vref3, respectively. The comparison outputs control the NPNs 235, 238. When the NPNs 235, 238 begin to be controlled, the feedback voltage FB becomes to be lowered from the upper limit level.

When the output voltage Vo is raised to reach the starting voltage (about 1,000 V), the output current Io begins to flow and the cold cathode fluorescent lamp FL is turned on. The output voltage Vo is then lowered to the operating voltage (about 600 V). Also at this timing, an excessive inrush current does not flow. While the output current Io is gradually increased, the output voltage Vo is maintained to a substantially constant operating voltage. When the output voltage Vo or the output current Io is increased and the NPNs 235, 238 are started to be controlled, the feedback voltage FB is gradually lowered from the upper limit level by the feedback operation through the feedback capacitors 136, 137.

Together with the rise of the slow-start voltage SS, the output current Io is increased and the feedback voltage FB is lowered. At the timing when the feedback voltage FB becomes equal to the slow-start voltage SS, the comparison object which is to be compared with the triangular signal CT in the PWM comparator 214 is switched to the feedback voltage FB from the slow-start voltage SS which has been the object. As a result, the slow start is ended. Since the operation of the cold cathode fluorescent lamp FL is started from the stopped state, the slow start requires a relatively long time.

The output current Io is constantly controlled to a predetermined value which is defined by the reference voltage Vref2. The brightness of the cold cathode fluorescent lamp FL depends on the current flowing through the lamp where an operating voltage of a substantially constant level is applied in order to maintain the current flowing. Therefore, the voltage Vo of a high level is applied in order to light the cold cathode fluorescent lamp FL in the starting period, however, once the lamp is turned on, a lower operating voltage can be used thereafter. In this regards, the feedback voltage FB is determined on the basis of the output current Io in the steady state.

A discharging circuit for discharging accumulated charges in the capacitor 141 is disposed in the start block 205 in preparation to again perform the starting period after the inverter is stopped. This charging process may be conducted in response to, for example, the start signal ST.

Next, the burst mode will be described. In the case of the burst mode in the analog light control, in the state where the power source voltage VCC is supplied to the controller IC 200, the burst triangular signal BCT of a predetermined frequency is generated by a burst triangular signal generating section which is configured by the BOSC block 202 serving as a burst triangular signal oscillator circuit, and the capacitor 131. The burst mode is controlled by changing the level of the analog duty signal Va-du to determine whether the signal crosses the burst triangular signal BCT or not, or adjust the crossing time.

Referring to FIG. 5, in the ON-duty period (ON DUTY) when the analog duty signal Va-du exceeds the burst triangular signal BCT, the PWM control is performed. By contrast, in the OFF-duty period (OFF DUTY) when the analog duty signal Va-du is lower than the burst triangular signal BCT, the PWM control is stopped, and the power supply to the cold cathode fluorescent lamp FL is stopped.

The PWM triangular signal CT has a frequency of, for example, 120 kHz. The burst control is performed with using the triangular signal BCT having a frequency of, for example, 150 Hz. Consequently, there arises no visual problem. Beyond the range where the cold cathode fluorescent lamp FL can be powered by a PWM control, the power supply, i.e., the amount of light can be adjusted in a wider range by controlling the level of the analog duty signal Va-du.

The circuit operation will be described more specifically. Referring to FIGS. 3 and 4, in the OFF-duty period, the burst signal BRT which is an output of the comparator 221 is at the L level, and the NPN 234 is turned OFF.

As a result, the diode 232 is forward biased by the constant current source 12, and the capacitor 136 of the feedback circuit is charged through the diode 232 by the constant current source 12. Therefore, the detection current IS has a high value, the error output of the first error amplifier 211 is at the high level, and the NPN 235 is turned ON. As a result, the feedback voltage FB is substantially zero.

In the PWM comparator 214, the lower one of the voltages of the two negative (−) input terminals is compared with the positive (+) triangular signal CT. Therefore, the PWM control signal is not output in the OFF-duty period.

At timing t1 when the OFF-duty period is shifted to the ON-duty period, the burst signal BRT is changed from the L level to the H level, and the NPN 234 is turned ON. As a result, the state where the diode 232 is forward biased by the constant current source 12 is canceled.

The charges in the capacitor 136 are discharged through the path of the constant current source I1, the capacitor 136, the resistor 140, and the resistor 115. In accordance with the discharging of the capacitor 136, the detection current IS is slowly lowered, and the feedback voltage FB is similarly slowly raised. Then, the detection current IS reaches the preset predetermined value, and the usual PWM control is performed.

As described above, when the OFF-duty period is shifted to the ON-duty period, the feedback voltage FB is slowly raised from substantially zero volt with a duration time due to the discharging operation of the capacitor 136 (the time is indicated by "α" in FIG. 5). Therefore, the pulse width of the PWM control signal is gradually widened with starting from a narrow state, so that the output current Io slowly starts to be gradually increased. Consequently, an overshoot due to the shift to the ON-duty period does not occur in the output current Io.

In the ON-duty period, the burst signal BRT is at the H level, and the NPN 234 is turned ON, so that the diode 232 is reversely biased to be turned OFF. At this time, the first error amplifier 211 generates an output corresponding to the input detection current IS, to control the degree of conduction of the NPN 235. This causes the PWM control signal to be supplied from the PWM comparator 214 to the logic block 203, so that the gate driving signals P1 to N2 are output and the PMOSs 101, 103 and the NMOSs 102, 104 are PWM-controlled.

At timing t2 when the ON-duty period is shifted to the OFF-duty period, the burst signal BRT is changed from the H level to the L level, and the NPN 234 is turned OFF. As a result, the diode 232 is forward biased by the constant current source 12.

The capacitor 136 is charged through the path of the constant current source 12, the capacitor 136, and the NPN 235. In accordance with the charging of the capacitor 136, the detection current IS is slowly raised, and the feedback voltage FB is similarly slowly lowered (indicated by "β" in FIG. 5). The detection current IS reaches the upper limit value (the power source voltage of the constant current source 12:3 V), and the feedback voltage FB is substantially zero volt. In this case, the PWM control is stopped.

As described above, when the ON-duty period is shifted to the OFF-duty period, the feedback voltage FB is slowly lowered from about the value obtained as a result of the PWM control, with taking a time due to the charging operation of the capacitor 136. Namely, slow end is performed. Therefore, the pulse width of the PWM control signal is gradually narrowed with starting from the width in the usual control state. Consequently, the output current Io due to the shift to the OFF-duty period is gradually decreased.

In the burst mode, unlike the starting period at the beginning, the cold cathode fluorescent lamp FL is already in the on-state. Therefore, time consuming for the slow start and the slow end in the burst mode shall be set to be shorter than that of a slow start in the starting period.

When a circuit for soft start in the starting period is used in slow start and slow end in the burst mode, the time α required for rising, and the time β required for falling are prolonged, and hence it is difficult to correctly perform the load control. By contrast, when a circuit for slow start and slow end in the burst mode is used in soft start in the starting period, it is impossible to effectively suppress an inrush current in the starting period.

With using the capacitor 136 disposed in the feedback circuit, slow start and slow end in the burst mode are performed, and the times for them are determined. Therefore, slow start and slow end can be adequately performed with using circuit elements which are disposed for the PWM control, without particularly disposing other circuit means.

Next, the operation in the case of the digital light control will be described with reference to FIGS. 3, 6, and 7. In this case, only the operation which is performed till the formation of the burst signal BRT is different from that in the analog light control, and another operation is common with that in the analog light control. Therefore, only different points will be described below.

Because of the burst mode in the digital light control, the burst constant voltage signal BCV of a constant voltage is generated by the burst triangular signal generating section which is configured by the BOSC block 202 serving as the burst triangular signal oscillator circuit, and the resistor 131A. The burst mode is controlled by changing the pulse width of the digital duty signal Vd-du, the frequency of pulses, and the presence of pulses. The time when the digital duty signal Vd-du is larger in level than the burst constant voltage signal BCV is adjusted by changing these factors, to perform the light control.

Referring to FIG. 7, in the ON-duty period (ON DUTY) when the digital duty signal Vd-du exceeds the burst constant voltage signal BCV, the PWM control is performed. By contrast, in the OFF-duty period (OFF DUTY) when the digital duty signal Vd-du is lower than the burst constant voltage signal BCV, the PWM control is stopped, and the power supply to the cold cathode fluorescent lamp FL is stopped.

At timing t1 when the OFF-duty period (OFF DUTY) is shifted to the ON-duty period (ON DUTY), and also at timing t2 when the ON-duty period (ON DUTY) is shifted to the OFF-duty period (OFF DUTY), signals such as the burst signal BRT, the detection current IS, the feedback voltage FB, and the output current Io are changed in a similar manner as those in the case of the analog light control of FIG. 5. In the digital light control, the operation can be performed in a similar manner as that in the analog light control, and a further accurate light control is enabled by the digital control.

As described above, two kinds of light controls or the analog light control and the digital light control can be performed by externally connecting the capacitor 131 and the resistor 131A to the BOSC block 202 of the controller IC 200 in a selective manner. Furthermore, the burst constant voltage signal BCV for the digital light control can be formed with using the BOSC block 202 for generating the burst triangular signal BCT. Therefore, it is not required for additionally disposing another constant voltage circuit for the digital light control.

According to the invention, in an inverter which performs a PWM control so that a current supplied to a load is constant, or a controller IC for such an inverter, switches of a semiconductor switching circuit are pulse-width-modulated to perform a constant current control, and also a control due to an intermittent operation is employed, whereby the range of power supply to the load is widened and a fine power control is enabled. The intermittent operation is controlled by setting an error signal for PWM to substantially zero when the intermittent operation is OFF. Therefore, the inverter and the controller IC can be simply configured.

The inverter and the controller comprise an intermittent operation triangular signal oscillator circuit which generates an intermittent operation triangular signal or an intermittent operation constant voltage in accordance with external connection of a capacitor or a resistor. Therefore, both of the analog light control and the digital light control can be performed correspondingly with a continuous duty signal Va-du or a pulsative duty signal Vd-du which is input from the outside.

The intermittent operation is controlled so that, when the intermittent operation is shifted to the OFF state, a capacitor included in a feedback circuit is charged in a direction along which the error signal of the PWM control becomes zero, and, when the intermittent operation is shifted to the ON state, the capacitor is discharged in a direction along which the error signal is increased from zero. According to the configuration, when the intermittent operation is turned OFF or ON, the error signal of the PWM control is slowly decreased or slowly increased. In both of the turning-ON and turning-OFF of the intermittent operation, therefore, a constant current control by PWM is performed in the form of slow start and slow end, so that the control state can be prevented from being rapidly varied, and an overshoot of an output current and noise generation of a transformer can be reduced.

In the intermittent operation, slow start and slow end are performed with using charging and discharging of the capacitor of the feedback circuit. In addition to slow start in starting of the inverter, therefore, slow start and slow end can be optionally set for a short time. As a result, slow start and slow end which are suitable to the intermittent operation can be performed.

What is claimed is:

1. A DC-AC converter comprising:
   a transformer having a primary winding and at least one secondary winding;
   a semiconductor switching circuit which allows a current from a DC power source to flow in first and second directions through said primary winding;
   a current detecting circuit which detects a current flowing through a load connected to said secondary winding;
   a triangular signal generating section which generates a triangular signal;
   a PWM control signal generating section which compares an error signal due to a current detection signal output from said current detecting circuit, with said triangular signal to generate a PWM control signal;

an intermittent operation triangular signal generating section which includes an intermittent operation triangular signal oscillator circuit and an intermittent operation capacitor, and which generates an intermittent operation triangular signal;

a comparing section which compares said intermittent operation triangular signal with a continuous duty signal to generate an intermittent operation signal; and an intermittent operation controlling section which, when an intermittent operation is turned OFF, sets said error signal to substantially zero on the basis of said intermittent operation signal; wherein said semiconductor switching circuit is switched in accordance with said PWM control signal.

2. A DC-AC converter comprising:

a transformer having a primary winding and at least one secondary winding;

a semiconductor switching circuit which allows a current from a DC power source to flow in first and second directions through said primary winding;

a current detecting circuit which detects a current flowing through a load connected to said secondary winding;

a triangular signal generating section which generates a triangular signal;

a PWM control signal generating section which compares an error signal due to a current detection signal output from said current detecting circuit, with said triangular signal to generate a PWM control signal;

an intermittent operation constant voltage generating section which includes an intermittent operation triangular signal oscillator circuit and a resistor, and which generates an intermittent operation constant voltage;

a comparing section which compares said intermittent operation constant voltage with a pulsative duty signal to generate an intermittent operation signal; and an intermittent operation controlling section which, when an intermittent operation is turned OFF, sets said error signal to substantially zero on the basis of said intermittent operation signal; wherein said semiconductor switching circuit being switched in accordance with said PWM control signal.

3. A DC-AC converter according to claim 1 or 2, wherein said PWM control signal generating section comprises: an error amplifier which compares said current detection signal with a reference voltage to generate said error signal; a PWM comparator into which said error signal and said triangular signal are input, and which generates said PWM control signal; and a feed back circuit including a feedback capacitor for feeding back said error signal to said current detection signal, and when the intermittent operation is turned OFF, said intermittent operation controlling section charges said feedback capacitor in a direction along which said error signal becomes zero, and, when the intermittent operation is turned ON, discharges said feedback capacitor in a direction along which said error signal is increased.

4. A controller IC for controlling a semiconductor switching circuit which drives a load, said controller IC comprising:

a triangular signal oscillator circuit which generates a triangular signal;

a PWM control signal generating circuit which compares an error signal due to a current detection signal indicative of detection of a current flowing through said load, with said triangular signal to generate a PWM control signal;

an intermittent operation triangular signal oscillator circuit which, when coupled with an external intermittent operation capacitor, generates an intermittent operation triangular signal, and which, when coupled with an external resistor, generates an intermittent operation constant voltage;

a comparing section which compares said intermittent operation triangular signal or said intermittent operation constant voltage which is generated by said intermittent operation triangular signal oscillator circuit, with a continuous duty signal or a pulse signal that is input from an outside, to generate an intermittent operation signal; and an intermittent operation controlling section which, when an intermittent operation is turned OFF, sets said error signal to substantially zero on the basis of said intermittent operation signal; wherein said controller IC generating a driving signal for switching said semiconductor switching circuit in accordance with said PWM control signal.

5. A controller IC according to claim 4, wherein said PWM control signal generating circuit comprises: an error amplifier which compares said current detection signal with a reference voltage to generate said error signal; a PWM comparator into-which said error signal and said triangular signal are input, and which generates said PWM control signal; and a feedback circuit to which a feedback capacitor for feeding back said error signal to said current detection signal is connected, and when the intermittent operation is turned OFF, said intermittent operation controlling section charges said feedback capacitor in a direction along-which said error signal becomes zero, and, when the intermittent operation is turned ON, discharges said capacitor in a direction along which said error signal is increased.

6. A controller IC according to claim 4 or 5, wherein said controller IC comprises an intermittent operation terminal to which said intermittent operation capacitor or said resistor is to be connected, and an input terminal into which said continuous duty signal or said pulse signal is to be input.

* * * * *